United States Patent [19]

Lassota

[11] Patent Number: 5,000,082

[45] Date of Patent: Mar. 19, 1991

[54] BEVERAGE MAKER AND METHOD OF MAKING BEVERAGE

[75] Inventor: Zbigniew G. Lassota, Des Plaines, Ill.

[73] Assignee: Food Equipment Technologies Company, Inc., Glenview, Ill.

[21] Appl. No.: 224,754

[22] Filed: Jul. 27, 1988

[51] Int. Cl.⁵ .......................... A47J 31/46; B67D 3/00
[52] U.S. Cl. ........................................ 99/304; 222/464
[58] Field of Search .................. 99/279, 280, 283, 299, 99/304, 305, 300, 306, 285, 292, 294, 282, 281, 293; 222/434, 48, 464, 444, 533, 146.5, 640, 641, 449, 526, 146.2; 239/37, 39, 40, 135, 128, 505, 506, 504; 137/579, 590, 453, 572, 577, 386

[56] References Cited

U.S. PATENT DOCUMENTS

| | | |
|---|---|---|
| Re. 25,663 | 10/1964 | Bunn ................................. 99/305 X |
| 152,773 | 2/1949 | Donaldson . |
| 157,407 | 2/1950 | Pappas . |
| 192,344 | 3/1962 | Hrabe . |
| 231,646 | 5/1974 | Bardeau . |
| 269,011 | 5/1983 | Stetler et al. . |
| 1,138,107 | 5/1915 | Hill . |
| 1,323,234 | 11/1919 | Faber . |
| 1,395,168 | 10/1921 | Tucker . |
| 1,840,985 | 1/1932 | Topper . |
| 1,930,618 | 10/1953 | Jones et al. . |
| 2,684,624 | 7/1954 | Alvarez . |
| 2,956,713 | 10/1960 | Kerley, Jr. .......................... 222/464 |
| 3,079,944 | 3/1963 | McLaughlin . |
| 3,133,558 | 5/1964 | Fajans et al. . |
| 3,425,337 | 2/1969 | Vittoe ................................. 99/300 X |
| 3,443,508 | 5/1969 | Reynolds et al. ................. 99/305 X |
| 3,479,949 | 11/1969 | Reynolds et al. ..................... 99/282 |
| 3,511,166 | 5/1970 | Bixby, Jr. . |
| 3,608,471 | 9/1971 | Martin . |
| 3,998,144 | 12/1976 | Curtis . |
| 4,008,656 | 2/1977 | Gruner . |
| 4,015,749 | 4/1977 | Arzberger et al. . |
| 4,056,050 | 11/1977 | Brown . |
| 4,059,181 | 11/1977 | Greenfield, Jr. et al. . |
| 4,064,795 | 12/1977 | Ackerman ......................... 99/305 X |
| 4,139,125 | 2/1979 | Arzberger et al. . |
| 4,252,252 | 2/1981 | Gross et al. . |
| 4,309,939 | 1/1982 | Stover . |
| 4,328,740 | 5/1982 | McDonough et al. . |
| 4,331,067 | 5/1982 | Mysicka et al. . |
| 4,464,981 | 8/1984 | Stover ............................... 99/300 X |
| 4,621,571 | 11/1986 | Roberts ............................... 99/280 |
| 4,656,932 | 4/1987 | Kopp . |
| 4,697,502 | 10/1987 | English et al. . |
| 4,819,553 | 4/1989 | Heyn et al. ....................... 99/299 X |

FOREIGN PATENT DOCUMENTS 737923 5/1980 U.S.S.R. .

Primary Examiner—Harvey C. Hornsby
Assistant Examiner—Scott J. Haugland
Attorney, Agent, or Firm—Potthast & Ring

[57] ABSTRACT

Hot water in a supply tank (38) of a coffee maker, (20) is dispensed through a shut-off valve including a tube (84) at a uniform rate for a preselected time period until the open inlet (84C) of the tube (84) is raised above the surface level (110) of the water to not only stop the flow but to also drain and steam clean the tube (84) of any residual water to prevent the formation of mineral and lime deposits which undesirably alter the flow rate. A brewing strength by-pass valve assembly (80) for passing diluted hot water to an urn (24A or 24B) is drawn from a supply temporarily collected at the bottom of a drain chamber (76) received into the top (76A) of the drain chamber (76) as a stream through air to pressure isolate the strength control by-pass valve (80) as well as a mixing nozzle (116A), so that adjustment of the strength control will not create a variation in back pressure to alter the uniform flow rate. The mixing nozzle (116) has drain spouts (118) at the ends of open channels for easy cleaning; it also has a level control tube (116B) to compensate for reduced flow rate when the by-pass valve assembly (80) is closed for maximum strength brew. The dry ingredient is held in a nondistorted filter which conforms to the body of a holder (230) with a by pass drain inlet (240) laterally spaced from the body formed by a square collar (234). A hot water drain assembly has an upper draw hole (158) for obtaining the hotest water through a hot water faucet (36) while also serving as a valve opening closure to a drain hole (160) at the bottom of the supply tank (38) with a handle above the surface (52) of the water. The beverage maker housing is made of sheet metal parts including a single H-shaped part (176) which forms a substantial part of upper (22C), intermediate (22B) and lower (22A) sections of the housing for improved strength and simplified assembly.

35 Claims, 7 Drawing Sheets

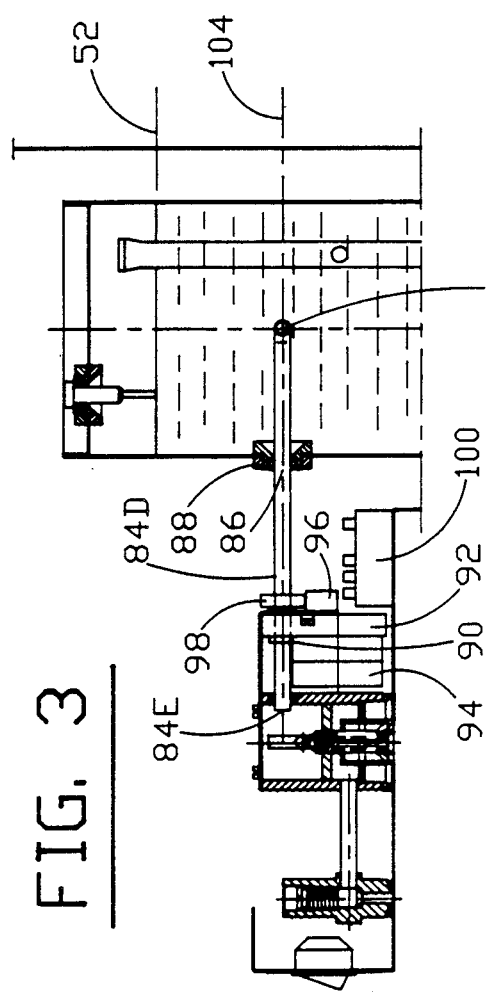
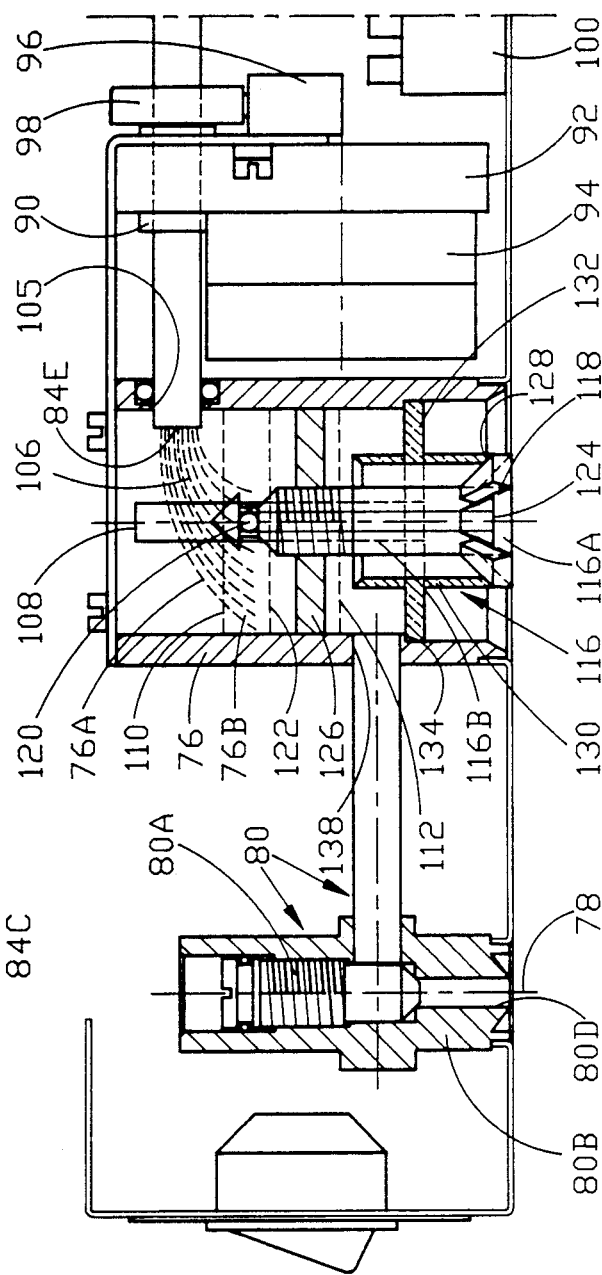

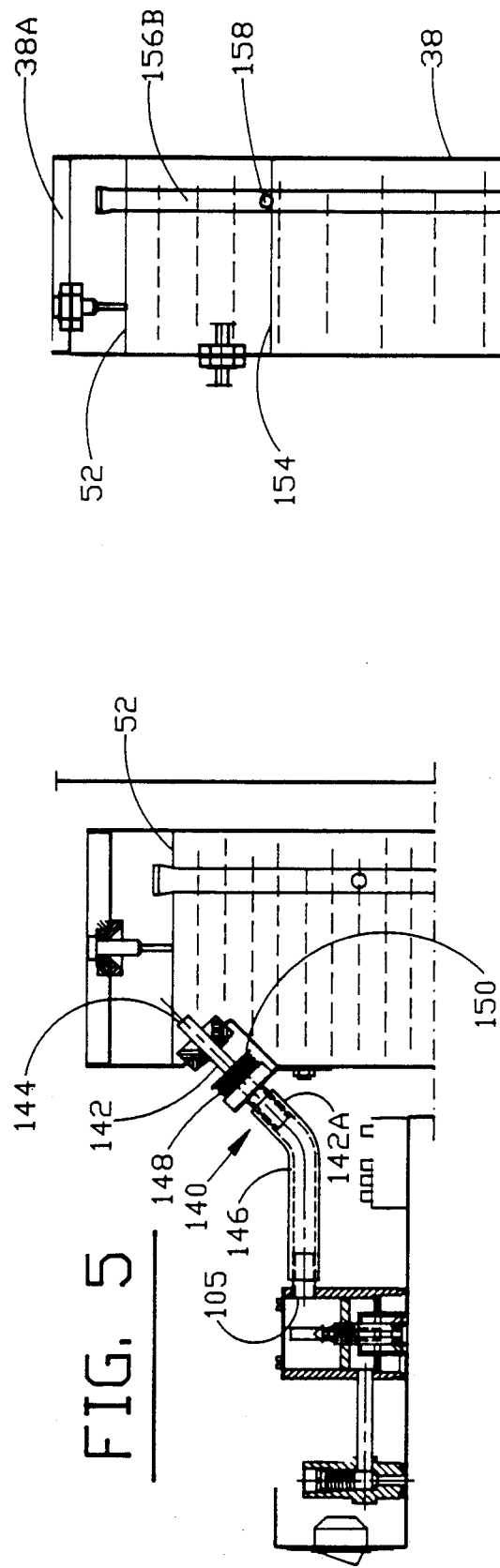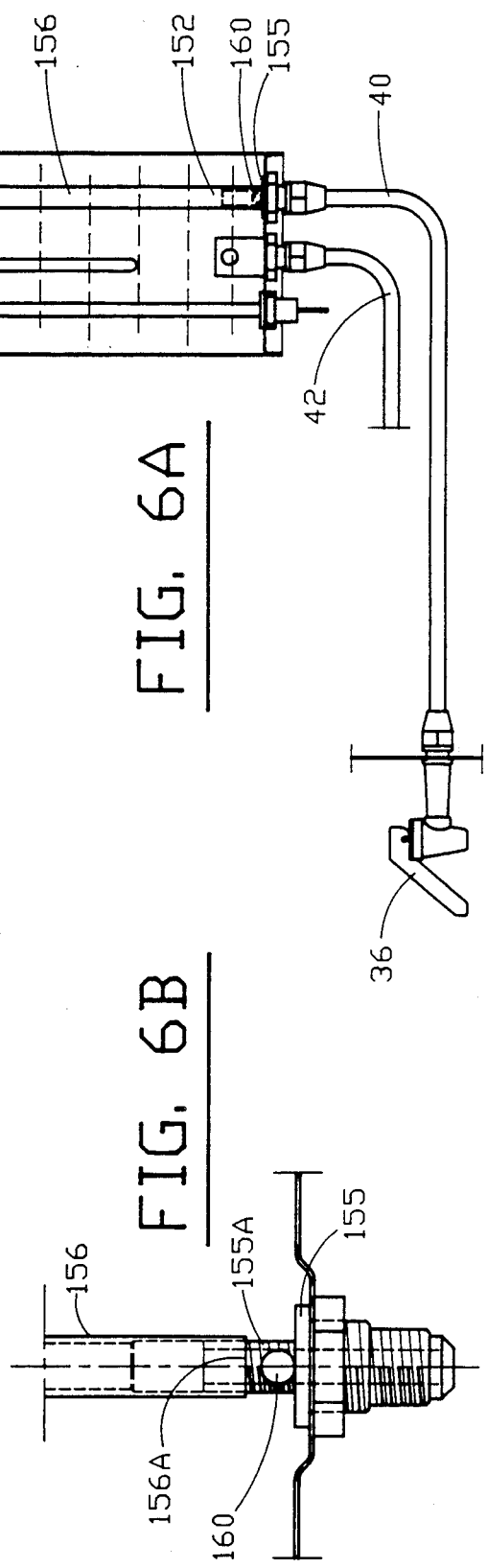

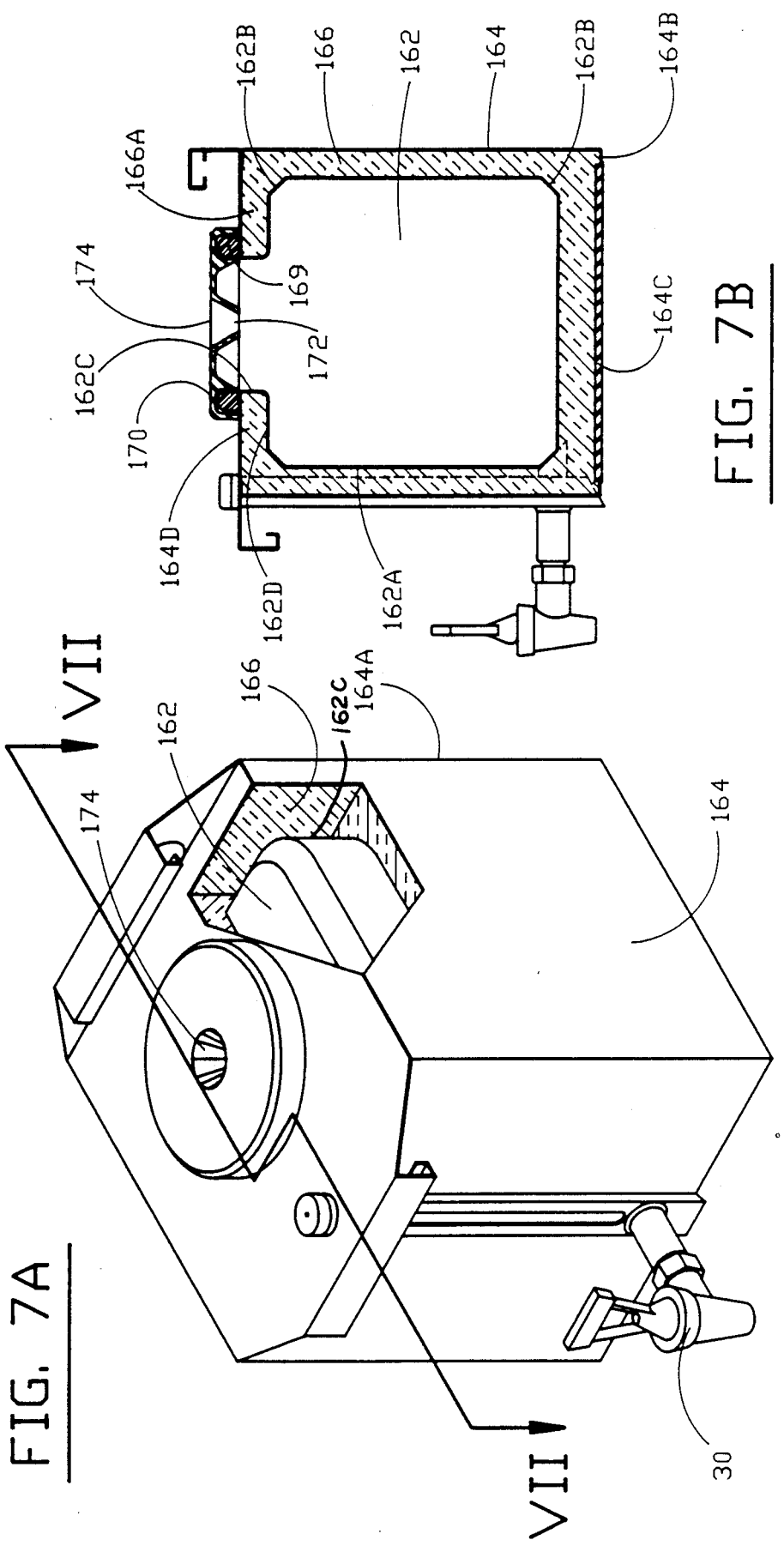

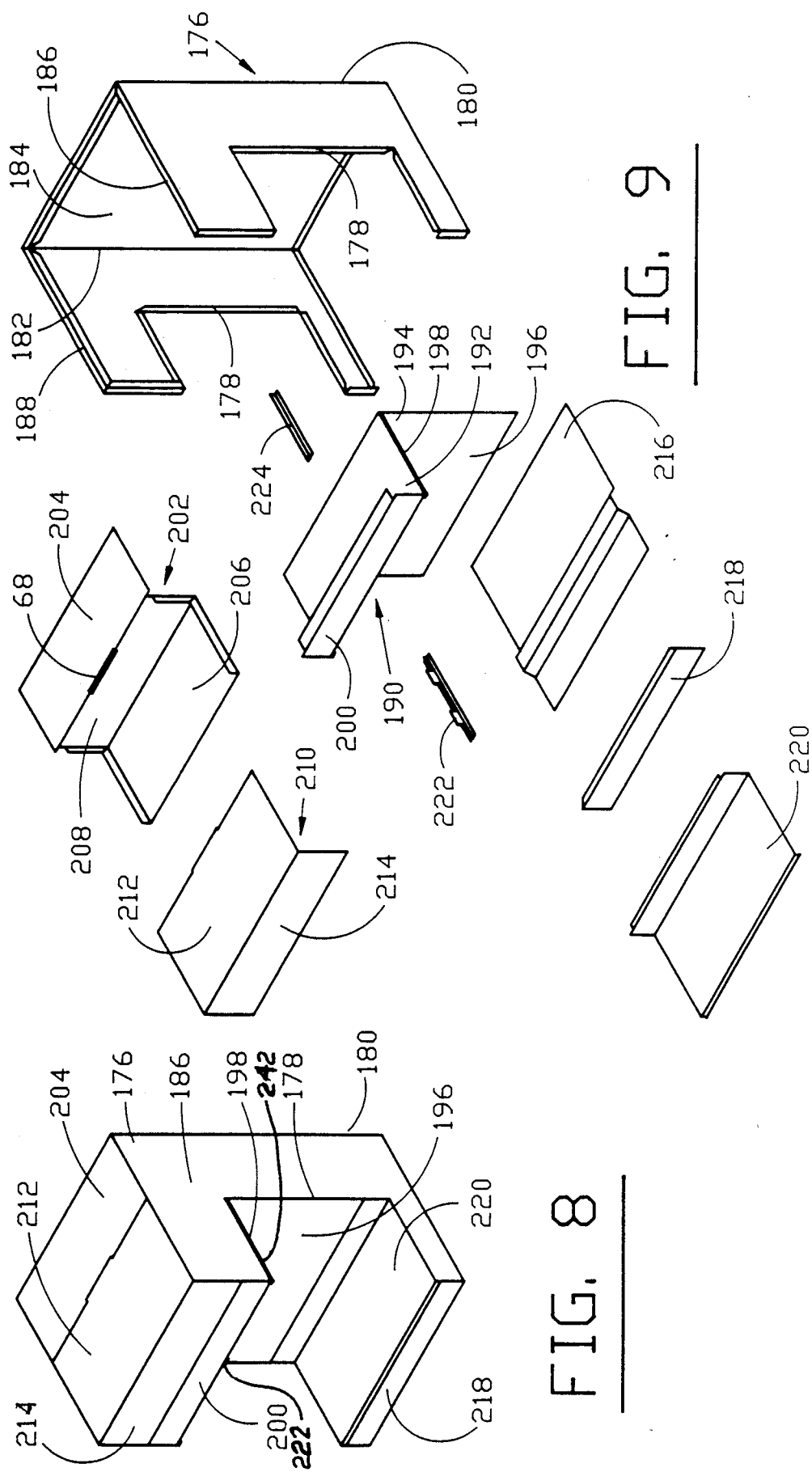

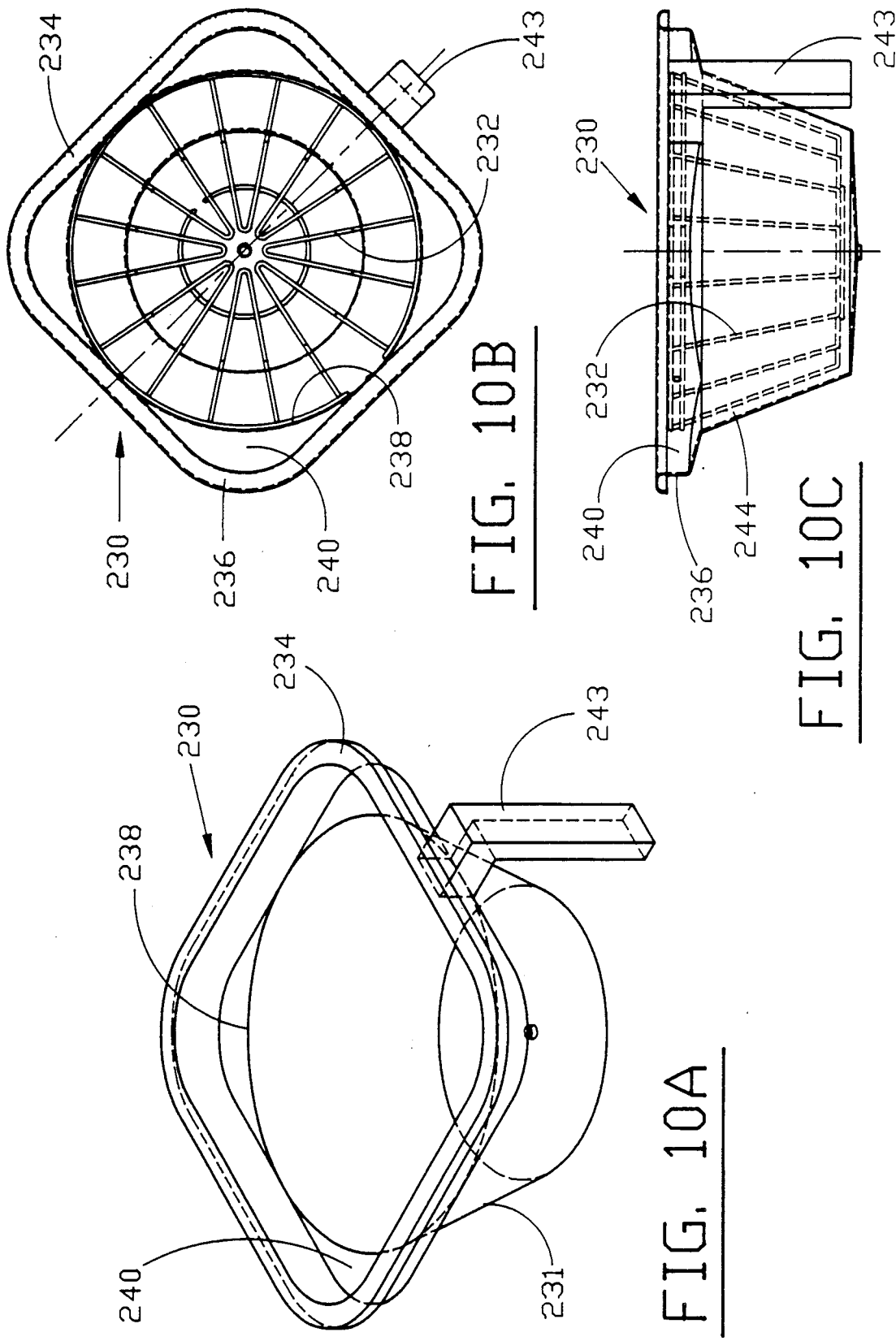

BEVERAGE MAKER AND METHOD OF MAKING BEVERAGE

BACKGROUND OF THE INVENTION

This invention generally relates to a beverage maker and method of brewing beverage by passing hot water through a dry ingredient, such as ground coffee or tea, and, specifically, to an automatic beverage maker of this type.

Beverage makers of the above general type which automatically brew coffee, tea or the like are well known, as illustrated by reference to U.S. Pat. Nos. 1,840,985 of Topper issued Jan. 12, 1932; U.S. Pat. No. 3,511,166 of Bixby, Jr. issued May 12, 1970; U.S. Pat. No. 3,608,471 of Martin issued Sep. 28, 1971; U.S. Pat. No. 3,998,144 of Curtis issued Dec. 21, 1976; U.S. Pat. No. 4,309,939 of Stover issued Jan. 12, 1982; U.S. Pat. No. 4,328,740 of McDonough et al. issued May 11, 1982; and U.S. Pat. No. 4,331,067 of Mysicha et al. issued May 25, 1982.

While the assemblage and structure of parts vary, all such beverage makers have in common certain basic components. The typical commercial sized coffee brewer on the market today, for instance, has a stainless steel or aluminuim, C-shaped housing with base, intermediate and upper sections. The base section has a shelf supporting a removable, portable, metal coffee container, or urn, of approximately 1.5 gallons capacity and a heating element located beneath the shelf for keeping the coffee warm. A metal, funnel-shaped, filter holder is slideably mounted to the upper housing section for receipt of hot water from a dispensing system within the upper section. The hot water seeps through the ground coffee contained with a disposable paper filter within the holder. The hot water is obtained from a hot water supply tank contained within the relatively narrow, upstanding rear housing section which supports one end of the cantilevered upper housing section in position above the base housing section and beverage container. The rear housing section also contains a thermostatically controlled heater for heating the water in the hot water supply tank to a preselected temperature, a sensor for detecting the surface of the hot water in the hot water supply tank, and an inlet valve mechanism. The inlet valve mechanism automatically opens to fill the supply tank with fresh water from a public source of water through a suitable pipe connection when the surface falls below a preselected level.

Opening of the inlet valve results when the hot water level inside the supply tank is lowered below the preselected level by the opening of a solenoid operated, dispenser outlet valve. The dispenser outlet valve is opened when a start switch is actuated to cause hot water to be passed to a spray head, or mixing nozzle. The spray head overlies and dispenses the hot water into the open, relatively wide, circular inlet of the funnel-shaped filter holder, from where it seeps through the grounds to brew the coffee. The freshly brewed coffee then passes out the relatively narrow, open outlet of the holder and into the portable coffee urn.

The dispenser outlet valve is closed a preselected time period after it is opened. Ideally, if the same measured amount of ground coffee is used for each brewing cycle and the time period during which the dispenser valve is open remains the same for each cycle, then the amount of hot water that will seep and the time it takes to seep through the ground coffee during each brewing cycle will be the same. Ideally, the consistency of the coffee for each brewing cycle will then remain the same, cycle after cycle.

Unfortunately, in reality, because most public water supplies contain substantial amounts of minerals and lime which condense out of the hot water to form mineral and lime deposits. These deposits are formed inside the hot water supply tank as well as on the inside surfaces of the dispenser outlet valve, the tubular connection to the spray head end all the intermediate fittings. These deposits form when residual hot water evaporates between brew cycles. These deposits also form when the hot water dispenser valve is closed and because of the repetitive heating and cooling of the water with which it is in continuous contact.

These mineral and lime deposits can form even when the dispensing system is not being used. For instance, formations can result because the hot water level falls when hot water is drained directly from a hot water faucet and cold water is then added to raise the level. Each time this happens, the heating element is energized to again bring the water up to the preselected temperature, and more deposits are formed. Unfortunately, the inlet of the hot water dispenser valve is connected to an outlet of the tank through a dispenser tube which is always in contact with the water. Thus, even when the dispenser valve is closed, it and the dispenser tube are subject to mineral formation.

Depending on the mineral content of the water, the formation of the deposits can grow very gradually, or the free flow of hot water through the dispenser valve and the remainder of the dispenser system up to the spray head, can be restricted in only a matter of weeks or even days. When the cross sectional area of the dispenser valve or dispenser outlet pipe are reduced by formations, the rate of flow, or volume of water which will pass the restricted area during a given time period for a given pressure, will be reduced, since the surface level and thus head pressure in the tank are maintained constant.

Unless the dispenser system is periodically cleaned of these deposits, eventually the amount of hot water which is dispensed over the preselected time period will be substantially less than that needed to fill the urn or to achieve the preselected volume/time ratio required for the best brewing result. The problem of deposits in the dispenser system is exasperated due to the many bends and kinks found in many systems which, together with the uneven deposits, cause varying turbulence that also alters the volume/time ratio of the dispenser system in unpredictable ways. In addition, sometimes the lime deposits will break away from the interior surface of the tank or other components of the dispenser system, and create an emergency by blocking the complete closure of the hot water dispenser valve.

Another problem with some coffee brewers is that the spray nozzles often contain small openings in a head which if clogged with mineral or lime deposits or the like are difficult to clean even after disassembled from the rest of the dispenser system. Consequently, the average user is forced to acquire a regular maintenance service contract to periodically clean the system and to replace parts which cannot be economically cleaned, such as the solenoid operated, hot water dispenser valve at substantial cost. On some units the user can increase the brew time period in order to fill the container despite the reduced flow rate, but in so doing, the quality of the freshly brewed coffee is altered and consistency is lost.

Another disadvantage of known hot water dispenser systems of coffee makers is due to the fact that the hot water dispenser outlet valve is closed not only to the hot water but, also to atmosphere. Accordingly, a separate air vent assembly to vent steam to atmosphere must be provided in the upper portion of the hot water supply tank to prevent the potential build up of explosive steam pressure in the tank. Since the dispenser valve inlet is beneath the normal surface level, a separate overflow system must also be provided.

Many conventional coffee brewers are also provided with a coffee strength control system. The strength control system passes a preselected portion of the hot water from the supply tank to a strength control, or by-pass, nozzle at a location spaced from the spray head, but which overlies a by-pass channel inside the body of the filter holder. Hot water entering the by-pass channel passes the filter and coffee grounds and goes directly into the beverage container to dilute the beverage.

Disadvantageously, known strength control systems are in direct liquid pressure communication with the hot water being dispensed through the spray head. The strength is selectively controlled by means of a manually operated by-pass valve in direct fluid communication with the outlet of the hot water dispenser valve. This strength control, or by-pass, valve can be set in different positions between closed, for full strength, and fully open for a minimum strength brew. Consequently, depending upon the setting of the strength control valve, during the preferred brew time period that the hot water dispenser valve is open, more or less hot water flows into the beverage container, even if there are no problems with mineral and lime deposits. The amount that flows through the spray head remains substantially the same regardless of the strength control setting, while for any strength setting except maximum strength, additional hot water enters through the strength control nozzle.

If the urn is only large enough for the quantity of hot water which is to be drawn when the strength setting is at maximum, strength settings less than maximum can result in a dangerous overflow condition. Thus, if oversized urns are not used, the preferred brew time period during which the hot water dispenser outlet valve is open must be shortened with corresponding decreases in brew strength settings in order to maintain the total quantity of beverage the same for different strength brews.

Due to the location of heating elements in the housing base to keep warm the coffee in the urn, there is no space for the control circuitry and other elements which must be located in the upper housing section. Accordingly, there is little or no room for storage in the upper section. The heating elements are required due to the fact that in known units the urns are made of metal and lack insulation on the inside or even at the top of the urn where temperature and, thus, heat loss are maximum. The containers generally also have a top which is substantially open, so that heat is lost by convection through the loss of steam and vapor as well as by radiation through the sides of the beverage container or urn.

In addition to an A/C power switch, most automatic coffee brewers also have a control switch which disables response to a start brew switch if in an ON position. The operator uses this switch to prevent accidental actuation of the start switch or inadvertent actuation when the water is not up to the preselected temperature. Unfortunately, such switches are unsafely mounted on the outside of the housing where they are both visible and accessible by unauthorized parties.

The base, intermediate upstanding section and upper section of the housings of known commercial sized coffee brewers are generally made separately from numerous parts and then assembled. Consequently, the cost of manufacturing the parts and the cost of assembly are increased while the advantages of a more integral housing design are lost.

In order for cleaning and other maintenance of the hot water supply tank, the tank must be periodically drained. The hot water cannot be drained through the hot water faucet, if the faucet is connected to an inlet adjacent the top of the tank where the water is hottest. Even if the inlet were at the bottom, a separate valve from the faucet is needed to prevent inadvertent draining through the faucet. Accordingly, such hot water supply tanks are drained by means of siphon or a separate sump pump.

Another difficulty with the known brew strength systems of known coffee makers is that the inlet to the by-pass channel and the by-pass channel are formed on the interior of the filter holder by attachment of a by-pass member which distorts the conical filter by holding it away from the conical side of the holder. In addition to the uneven flow through the coffee grounds due to the asymmetrical distortion of the conical shape, such by-pass members are often insufficient to prevent collapse of the filter against the inside conical surface of the brew basket and the resultant partial or whole blocking of the by-pass channel.

SUMMARY OF THE INVENTION

It is therefore a principal object of the present invention, to provide an improved beverage maker and method of making beverage which overcomes the disadvantages of the known coffee makers and methods noted above.

The problem of mineral and lime deposits reducing the flow rate of the liquid ingredient from the supply tank is substantially eliminated by means of a free, open and clear dispenser outlet shut-off valve assembly with a valve outlet and valve inlet which are kept in open fluid communication with each other to drain the outlet and valve of liquid at the conclusion of the brew cycle. The valve inlet is one open end of a tube which is raised to a preselected shut-off level above a preselected surface level at which the liquid is maintained to block flow of liquid into the valve inlet opening. In order to open the dispenser valve, the valve inlet opening is lowered to another preselected open level below the preselected liquid surface level in the supply tank. This results in uniform flow therethrough and through the tube and out of the dispenser valve outlet opening at the end of the tube for dispensing into the dry ingredient filter holder.

The tube is drained between each brewing cycle. A vertical component of the orientation of the tube facilitates gravity draining of the residual water in the tube when the dispenser outlet valve is closed. When the supply tank contains hot water, steam under pressure is located in the space above the liquid. Since the valve inlet opening is located in this steam pressured space, the escape of the steam to atmosphere through the tube also assists in draining of the tube and reduction of mineral deposits. In addition, the tubular shut-off valve cannot be blocked into an open position by deposits as in known valves.

In keeping with another aspect of the invention, the dispenser valve performs a dual function by raising the valve inlet to a preselected overflow level above the maximum preselected surface level of the liquid. The dispenser valve will thereby automatically convey excess liquid to the holder in the event of an overflow condition and will also prevent the build-up of excessive pressure in the supply tank.

In one embodiment, the tube is curved and is rotated by means outside the tank to raise and lower the dispenser valve inlet opening, and in another embodiment, the tube is substantially straight and extended in length to raise and lower the dispenser valve inlet opening. In both embodiments, the tube is kept smooth and without kinks or other obstruction which cause turbulence and resultant non-uniform flow.

It is therefore a specific object of the invention to provide a beverage maker with an improved dispenser shut-off valve, comprising a tube having a tubular body extending through a dispenser outlet hole in a liquid supply tank between a fixed end with a free valve outlet opening outside of the supply tank and a distal end with a free valve inlet opening inside the supply tank and in fluid communication with the valve outlet opening through the tubular body, and means for selectively moving the distal end and free valve inlet opening between an open position at a preselected depth below the preselected surface level to enable said liquid to flow through the free opening, the tubular body and finally out through the valve outlet opening at a preselected uniform rate, and a closed position above the preselected surface level of any liquid within the supply tank to block removal of said liquid through the free valve inlet opening.

Likewise, it is an object of the invention to provide in a hot beverage maker having a supply of hot water to pass through a dispensing system for mixing with a dry beverage ingredient, an improved method of selectively dispensing said hot water from the supply tank to reduce formation of solid deposits in said dispensing system which evaporate out of said hot water, comprising the steps of drawing said hot water from the tank through a smooth, open, free flowing tube by submerging an open, movable end thereof below the surface of the liquid in the hot water supply tank and withdrawing water through a freely open, fixed end of the tube outside the supply tank, terminating the dispensing of hot water through the tube by raising the open movable end above the surface of the hot water. Residual water is then removed from the entire tube by holding at least a portion of the tube at an angle having a verticle component to cause gravity to drain residual water out through the open fixed end of the tube outside of the supply tank while keeping the fixed end freely open to atmosphere.

The problem of non-uniform flow rate is further alleviated by pressure isolating the dispenser outlet of the supply tank from the variations in pressure down line of the supply tank due to any reason does not adversely affect the uniform flow rate from the supply tank and thus alter the total amount of liquid passed to the urn.

Specifically, a beverage maker with a system for conveying the liquid ingredient through the dry ingredient is provided with means for removing liquid from the supply tank at a preselected rate and a pressure isolation drain chamber for receipt at said preselected rate and temporary collection of the liquid before passing it through to the dry ingredient holder. The drain chamber has an upper portion for free flowing receipt through air of a stream of liquid from the supply tank and a lower portion for passing the liquid received at the upper portion to the dry ingredient holder at a rate relative to the preselected rate that said stream of liquid is received in the upper portion to maintain the level of liquid temporarily collected therein beneath said upper portion.

While this will protect against variation in back pressure due to spray nozzle clogging or the like, it is particularly useful to isolate the supply tank from more recurrent variations in back pressure due to changes in the beverage strength by-pass valve. Thus, it is an object of the invention to provide a beverage maker with an improved pressure isolating, drain assembly comprising a drain chamber having an upper portion with an inlet for receipt of liquid from the supply tank and a lower portion for temporary collection of the liquid before passing the collected liquid to the mixing nozzle, means for isolating the head pressure of the supply tank liquid from the temporary collection of liquid in the drain chamber, and means for connecting a strength control by-pass valve assembly to said lower portion to draw liquid from said temporary collection of liquid in the lower portion of the drain chamber.

Likewise, it is an objective to provide a method of making a preselected quantity of beverage of different selected strengths, comprising the steps of passing a preselected quantity of liquid ingredient to a drain chamber at a preselected rate, temporarily collecting said liquid ingredient in the drain chamber, substantially isolating the pressure of the water collected in the drain chamber from the pressure of the liquid ingredient being passed to the drain chamber at said uniform rate, passing a portion of the liquid collected in said drain chamber through a dry ingredient to a beverage container, and passing another preselected portion of the liquid collected in said drain chamber directly into the container and by-passing the dry ingredient.

In a preferred embodiment, the level of the liquid collected in the drain chamber is kept below an inlet in the drain chamber from which the liquid is received by automatically increasing the rate at which liquid ingredient passes through the ingredient in response to decrease in the rate at which collected liquid ingredient is passed directly to the container and by-passing the ingredient, and vice versa.

The difficulties encountered with a spray head with holes which become clogged with mineral deposits or the like and require cleaning are overcome by providing a beverage maker with a dispenser nozzle assembly comprising a drain chamber for temporarily collecting liquid ingredient from the supply tank prior to it being dispensed through an outlet opening thereof into the dry ingredient holder, a dispenser nozzle having a body with a plurality of open channnels attached to the drain chamber with a peripheral edge in substantial contiguous mating relationship with said outlet opening except at a plurality of spouts, said spouts being defined partly by said open channels and partly by the drain chamber at the periphery of the outlet opening. The nozzle is detachable from the drain nozzle to thereby open the spouts along their length for simplified cleaning.

In keeping with another aspect of the invention, the beverage container is insulated to eliminate the need for electric heating to keep the beverage warm. This not only conserves electricity, but also prevents the deterioration of the beverage caused by heating after brewing. In addition, the elimination of heating elements makes other space in the beverage maker housing available for storage. In a preferred embodiment, the hot beverage maker is provided with an improved beverage container assembly comprising an outer metallic housing with a top, sides and bottom, an inner metal container in said housing and having a metal inlet opening on a neck extending above the top of the metallic container, a layer of thermal insulating material intermediate the inner container and the outer metallic housing at the top sides and bottom, and an insulating funnel body with a funnel inlet opening above the neck for receipt of beverage, a relatively small outlet opening within the neck for conveying liquid into the container and a resilient insulating collar for releasibly attaching the body to the neck and insulating the neck.

In keeping with another aspect of the invention, the housing is arranged so that the power switch, and preferably a control switch, are mounted in a storage compartment and thereby protected against unauthorized or inadvertent actuation of either switch. In the preferred embodiment, the improved housing comprises an upper section with a top and a storage compartment having a movable lid forming at least part of the top and including means for mounting said power switch within said open storage compartment. The upper section also includes means for mounting at least a part of the hot liquid dispensing system beneath the storage compartment, while an intermediate section is provided for holding the supply tank and at least part of said control circuit, and a base section is provided for for supporting said container.

The construction of the beverage maker housing of the present invention is also improved by using a single piece of sheet material to form the basic frame for the upper, intermediate and base sections of the housing and to otherwise reduce the number of separate pieces of the housing and the number of steps required for assembly. In the preferred embodiment, the beverage maker housing comprises a first generally H-shaped integral part with two right angle bends to define edges of the back of the upper section, the intermediate section and the base section, with a pair of parallel walls with relatively wide slots therein to separate said walls into the parallel sides of said upper section, said intermediate section and said base section, a second part and a third part. The second part has two opposed right angle turns and is fixedly attached to said first part to form the front of the intermediate section and the cantilevered underside of the upper section as well as at least a part of the front of the upper section. The third part is attached to the top of the first part and extends between said parallel walls to form at least part of the top of said upper section.

Another improvement of the beverage maker of the present invention is the provision of a supply tank drain assembly comprising a connector adjacent the bottom of the supply tank for passage of liquid therethrough to the hot water faucet and an elongated tube releasibly coupled to said connector at one end and extending upwardly therefrom to an inlet draw opening adjacent the top of the supply tank for drawing liquid from adjacent the surface of the liquid and passing it to the connector. This arrangement enables draining of the supply tank through the nozzle, but only if the elongated tube is disconnected from the nozzle connector adjacent the bottom, and, thus, inadvertent draining is prevented. In addition, hot liquid can be drawn from near the surface of the liquid in the supply tank where the water is hottest.

Preferably, the elongated tube is not only releasibly connected but in fact can be used as a movable valve member which need not be disconnected from the connector in order to drain the supply tank. In such case, the supply tank drain assembly comprises a nozzle connector mounted to the supply tank for flow of liquid from an inlet thereof adjacent the bottom of the supply tank to the nozzle, means including a movable valve member for blocking the drain inlet when in closed position and unblocking the drain inlet when in an open position, and a handle member connected with the valve member and accessible adjacent the top of the supply tank for selectively moving said valve member between said open and closed positions.

Yet another object of the invention is the provision of a beverage maker having a dry ingredient filter holder in which the by-pass drain is formed outside of circular inlet of the holder rather than inside the holder to eliminate disortion of the filter or collapse of the filter with resultant blockage of the by-pass. Specifically, in a beverage maker having a dispenser nozzle for dispensing liquid ingredient into a generally funnel shaped filter element for holding dry ingredient and contained within a dry ingredient filter holder, a by-pass nozzle for dispensing liquid ingredient at a preselected location spaced from said dispenser nozzle for passing liquid into the ingredient filter holder but by-passing the filter and dry ingredient, and means for holding the filter holder properly aligned with the by-pass and dispenser nozzle, a dry ingredient filter holder is provided, comprising a body for holding a generally funnel shaped filter and having a relatively wide inlet and a relatively narrow inlet, and a collar having a section attached to the inlet of the body and extending outwardly away from the periphery thereof at at least one location to form at least one by-pass inlet for receipt of liquid from the by-pass nozzle, and means for slideably attaching said collar to said tracks to align said by-pass inlet with the by-pass nozzle.

BRIEF DESCRIPTION OF THE DRAWINGS

The foregoing objects, features and advantages will be explained in greater detail and other objects, features and advantages will be made apparent from the following detailed description of the preferred embodiment which is given with reference to the several figures of the drawing, in which:

FIG. 3 is an enlarged portion similar to that of a portion of the sectional side view of FIG. 2 except showing the liquid dispenser shut-off valve in its open position instead of in the closed position, as illustrated in FIG. 2;

FIG. 4 is an enlarged sectional side view identical to that of FIG. 3 to more clearly illustrate the drain chamber, the beverage strength by-pass control valve and the collection of liquid to levels above and below the level control inlet opening depending upon the position of the strength control by-pass valve tube;

FIG. 5 is a sectional side view of an alternative embodiment of the shut-off valve of FIGS. 2 and 3 in which the valve comprises a substantially elongate tube that is extendable in length;

FIG. 6A is an enlarged sectional side view of a portion of FIG. 2 to more clearly illustrate the supply tank and drain assembly associated therewith;

FIG. 6B is a cross sectional side view of the faucet connector with drain hole of the drain valve assembly of FIG. 6A which illustrates the hot water drain valve assembly in its open position;

FIG. 7A is an enlarged perspective view of one of the beverage containers, or urns, of the beverage maker of FIG. 1A;

FIG. 7B is a sectional side view of the urn taken along section line VII—VII of FIG. 7A;

FIG. 8 is a perspective, simplified, view of the housing of the beverage maker of FIGS. 1A and 1B but without the removable dry ingredient holders and beverage containers attached;

FIG. 9 is an exploded view of the housing of FIG. 7;

FIG. 10A is a perspective view of the dry ingredient holder of FIG. 1A;

FIG. 10B is a plan view of the dry ingredient holder of FIG. 10A;

FIG. 10C is a side view of the dry ingredient holder of FIGS. 10A and 10B; and

DETAILED DESCRIPTION

Figures 1B, 1C:
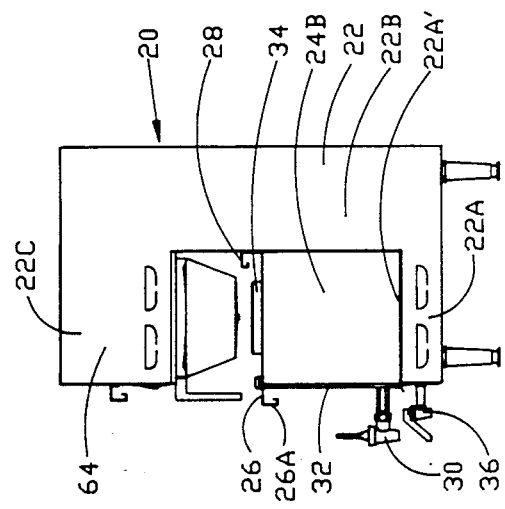
FIG. 1B is a side view of the beverage maker of FIG. 1A.
FIG. 1C is a top view of the beverage maker of FIGS. 1A and 1B.
Figure 1A:
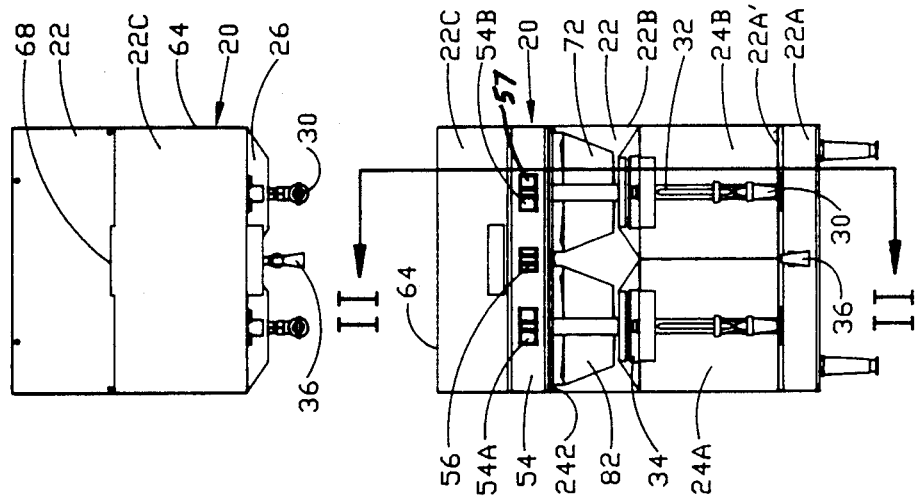
FIG. 1A is a front view of the preferred embodiment of the beverage maker of the present invention.

Referring now to the drawings, particularly FIGS. 1A, 1B and 1C, the preferred embodiment beverage maker 20 of the present invention is seen to have a stainless, sheet metal housing 22 with a base section 22A, an upstanding intermediate section 22B and an upper section 22C. The base section 22A has a shelf 22A' which supports left and right beverage containers, or urns, 24A and 24B, each of which can hold approximately 1.5 gallons of beverage.

In order to simplify, since each of the urns 24A and 24B are substantially identical, only the details of urn 24B will be given reference herein with the understanding that urn 24A has the same parts which function in the same way. The beverage container 24B is portable, and urn 24B has a forward handle 26 and a rearward handle 28, although the urn 24B can be left on top of shelf 22A' during service. If the urn 24B is moved to a different location, a vertical member 26A of the forward handle 26 is employed to first slide the urn 24 forwardly, away from the intermediate section 22 until the rearward handle 28 becomes accessible. The urn 24B can then be lifted by both a horizontal portion of the forward handle 26 and the rearward handle 28 and thereby put on a portable cart or the like. The forward handle 26 thereby advantageously serves a dual function. In addition to the handles, the urn 24B also has a conventional beverage spigot, or faucet, 30 which is in fluid communication with the urn 24B as well as a conventional level gage 32. Also, as will be described below in detail with reference to FIGS. 7A and 7B, the urn 24B is well insulated by means including an insulating cover, or cap, 34.

Figure 2:
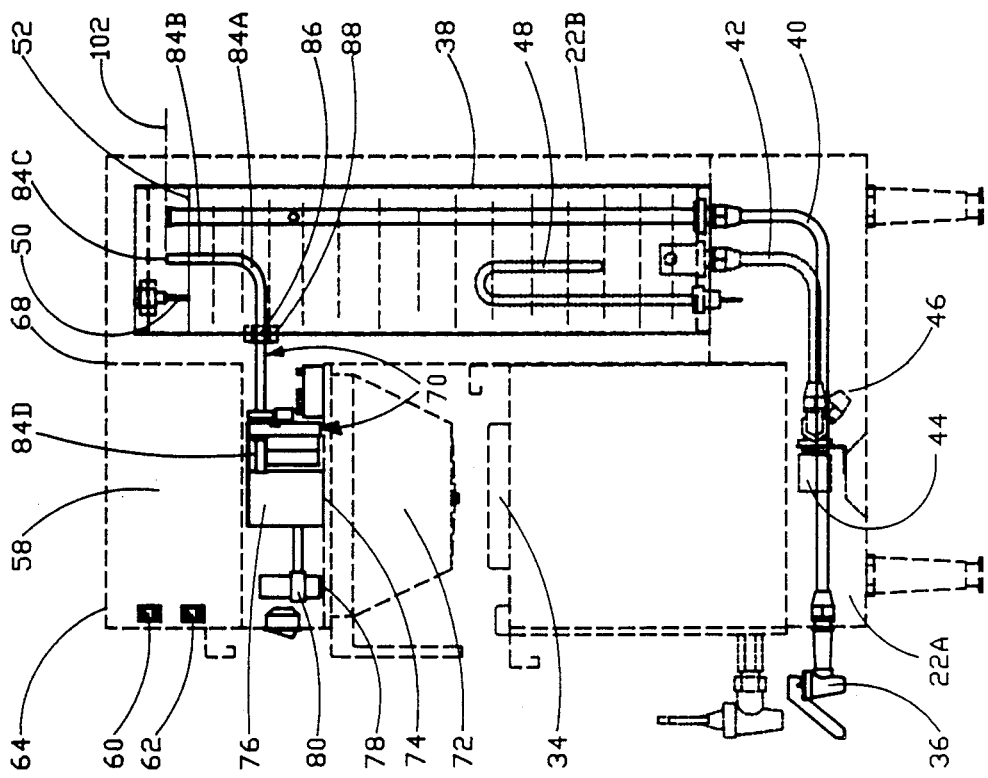
FIG. 2 is a sectional side view taken along section line II—II of FIG. 1A and showing the liquid dispenser shut-off valve in its closed position.

Referring also to FIG. 2, the base section 22A also has a hot water faucet 36 which itself is not unique, but which is connected to a hot water supply tank 38 in an advantageous way as will be described with reference to FIGS. 6A and 6B. The hot water supply tank 38 is located within the intermediate section 22B which also houses the connecting outlet pipes and the associated fittings 40 between the hot water supply tank 38 and the hot water faucet 36 and connecting inlet pipes 42 and associated fittings to feed fresh water to the hot water supply tank from a fill valve 44 connected with an external public source of supply by means of an inlet fitting 46. The intermediate section 22B also houses connections between a heater control circuit including a thermostat and a heating element 48. Another control circuit (not shown) controls the operation of the fill valve 44 in response to a level detector 50. Level detector 50 is set at a preselected level 52 at which the surface of the liquid in the supply tank 38 is maintained.

Still referring to FIGS. 1A, 1B and 1C, the upper section 22C has a control panel 54 at its front with left and right start switches 54A and 54B, and status indicator lights 56. In accordance with one of the safety features of the invention, in addition to the start switches of the control panel 54, the top section has a filter storage compartment within which are protectively mounted a power switch 60 and a control switch 62. For additional security against unauthorized operation of the coffee maker 20, either or both of the power switch 60 and control switch 62 are lock key operated. Alternately or additionally, a storage compartment cover 64 which is pivotally mounted to another piece 68 of the top section 22C by a hinged connection 68 is provided with a key operated lock.

In addition to the storage compartment 58, the upper section 22C houses a hot water dispenser system 70, which as will be explained in greater detail with reference to FIGS. 3 and 4, dispenses hot water from the hot water supply tank 38 into ground coffee or other dry ingredient (not shown) which is contained within a dry ingredient, or filter, holder 72. The filter holder 72 is slideably mounted to the inside of the cantilevered portion of the upper section 22B. As will be explained in greater detail below with reference to FIGS. 10A, 10B and 10C, the hot water is dispensed into the holder at two locations: a mixing nozzle location 74 beneath a pressure indicating drain chamber 76 and a by-pass location 78 beneath a beverage strength control by-pass valve 80. The water dispensed at the mixing nozzle location 74 enters the filter inlet and seeps through and mixes with the ground coffee to make brewed coffee which then flows into an opening in the insulating cap 34 and into the urn 24B. An identical dispenser system (not shown) operates in an identical fashion as the dispenser system 70 but dispenses hot water through another filter holder 82, FIG. 1A, from which freshly brewed coffee flows into the left urn 24A, and with this understanding, this other dispenser system will not be shown or described.

Referring now to FIG. 3, in addition to FIG. 2, in the preferred embodiment, the dispenser system, or assembly, 70 is seen to include a dispenser shut-off valve including a metal tube 84 which has an elongate tubular body with a curved portion 84A intermediate a distal end portion 84B, with a free dispenser valve inlet opening 84C located inside the supply tank 38, and a fixed end portion 84D with a free dispenser valve outlet opening 84E, FIG. 3, located outside the supply tank and connected with the drain chamber 76. The tubular body extends through a supply tank outlet hole 86 and is rotatably secured to a side wall of the supply tank 38 for rotation about a substantially horizontal elongate axis of the fixed end portion 84D of the tube 84 by means of a suitable water tight bearing 88.

The fixed end 84D is also supported by a water tight bearing 90 of a rotary drive linkage 92 which is powered by a reversible, rotary electric motor 94, all of which are secured to a mounting plate 96 attached to the top of, and advantageously forming a cover of, the top of the drain chamber 76. The operation of the motor 94 is controlled in accordance with cam actuated microswitches 96 operated by a cam 98 which is attached to and rotates with distal end 84D of the tube 84 and a timer 100 in a manner to be explained with reference to the control circuit of FIG. 11.

Briefly, before start of the brew cycle, i.e. before actuation of the start switch 54B, the tube 84 is held with the distal end portion in the upright shut-off position, as shown in FIG. 2, such that all water flow from the supply tank through the tube 84 is blocked by the sidewall of the distal end portion 84B. Preferably, when the tube 84 is in this shut-off position, the valve inlet opening 84C is raised to a preselected overflow level 102, FIG. 2, above the preselected surface level 52. In this way, the tube 84 advantageously performs an additional two functions. It functions as an oveflow drain in the event the level control apparatus should fail and as a pressure release vent. This eliminates the need for a separate overflow vent required in known beverage makers which employ a shut-off dispenser valve that blocks all fluid flow when closed. This also eliminates the need for a separate pressure release vent, since the tube 84 is open to atmosphere at its distal end, and thus functions to vent any excess steam pressure in the supply tank to the atmosphere.

In keeping with another aspect of the invention, the top of the supply tank is covered, so that the steam pressure is built up in the space between the top of the supply tank and the surface level of the hot water. This steam is ejected through the tube to facilitate complete draining of residual liquid from the tube 84 when the dispenser valve is closed to prevent mineral and lime deposits within the tube 84.

Advantageously, even in the absence of steam pressure to clear the tube of residual water, because a substantial portion of the tube 84 has at least a partial vertical orientation, such as the distal end portion 84B and part of the curved portion 84A, gravity tends to drain the tube 84 of residual water when the tube is in the closed position as shown in FIG. 2. While the fixed end portion 84D of the tube 84 is substantially horizontal, it, too, preferably has a slight downward slant to facilitate complete draining of the tube.

When the start switch 54B is actuated, the control causes the electronic motor to be energized to rotate the fixed end portion 84D until the valve inlet opening 84C is lowered to a preselected open position at a preselected drain level 104 between the preselected surface level at which the water in the tank is maintained, as shown in FIG. 3. Once the valve inlet 84C has reached the preselected drain level 104, the flow rate of hot water remains constant since the difference between levels 104 and 52 is kept the same and thus the hydraulic pressure causing the hot water to flow through the tube is substantially constant. Since the cross sectional area of the tube is kept substantially constant by virtue of the aforementioned draining process, the flow rate remains constant.

The timer 100 is also actuated in response to actuation of the start switch 54B is actuated to start a preselected time period. For brewing coffee, it is preferred to have this time period at approximately 4.0-5.0 minutes for making 1.5 gallons of brewed coffee, although other time periods can be used and may be preferred for dry ingredients other than coffee or if a different quality of brewed beverage is to be prepared.

At the end of the preselected brewing time period, the electronic motor 94 is again energized in a reverse polarity sense to cause it to rotate the distal end portion 84D until it is returned to the closed position, again, as shown in FIG. 2. The brewing cycle is then complete except for completion of seeping of the last of the hot water through the dry ingredient.

Referring to FIG. 4, the tube extends into a drain chamber inlet 105 with the valve outlet opening 84E located at one side of an air filled upper portion of pressure isolating drain chamber 76. When the dispenser shut-off valve is open, the hot water freely flows through the tube 84 and enters the upper portion 76A as a stream 106 through air. Advantageously, the tube 84 is kept free of kinks, restricted openings or other factors to reduce turbulent flow which would deter from maintenance of a uniform flow rate. A pair of tubular vents 108 keep the upper portion 76B open to atmosphere and also function as overflow drains in the event of an overflow condition in the drain chamber 76. Part of the stream 106 strikes the opposite side of the drain chamber before falling into a lower portion 76B beneath the inlet 105.

The hot water is then temporarily collected in the lower portion 76B to a level approximately between an upper level 110 and a lower level 112 during receipt of the stream 106. The water temporarily collected in the lower portion 76B is dispensed from the drain chamber 76 at a rate which varies slightly depending upon the setting of the brew strength control nozzle assembly 80. However, the average rate that the water is dispensed from the drain chamber 76 is approximately the same as the uniform rate of the stream 106 of water entering the top of the drain chamber 76, so that the hot water temporarily collected in the lower portion 76B is maintained between upper level 110 and lower head 112 throughout most of the brewing cycle.

The level of the temporarily collected water must be maintained below the upper level 110 in order to maintain air space in the upper portion 76A and, thus, pressure isolation between the temporarily collected water in the lower portion 76B and the water flowing into the upper portion 76A through the inlet 105. In the present invention, this is achieved by means including a mixing nozzle assembly 116. As best seen in FIG. 4, the mixing nozzle assembly 116, includes a spray nozzle head having a body 116A which closes an opening in the bottom of the drain chamber 76 except for a plurality of drain spouts 118 formed at the peripheral edge of the body and an elongate level control tube 116B attached to the center of the body 116A and extending upwardly therefrom through the lower portion 76B of the drain chamber 76 to an inlet port 120 at a preselected control level 122 beneath inlet 105. An outlet 124 is provided at the other end of the level control body at the bottom of body 116A. In the event that the surface of the temporarily collected water reaches to or above the inlet port 120, it begins to flow out of the drain chamber assembly 76 through the level control tube 116B in addition to flowing through the spouts 118 of body 116 to increase the total rate of outflow of the mixing nozzle assembly 116.

Advantageously, the control tube 116B performs a dual function. The end of the level control tube 116B is threaded at the end adjacent the inlet port 120 and is used to releasibly fasten itself and, also, the nozzle body 116 to which it is attached, to an internally threaded mounting member 126. The spouts 118 are formed at the ends of a plurality of open V-shaped channels that face upwardly to receive the liquid. The nozzle body 116A is circular in cross section and has its upper surface at the periphery of the body 116A in substantial, contiguous mating relationship with an outlet opening 128 at the bottom of a cylindrical, open topped, mixing well 130. The upper surface of the nozzle body 116 is raised to facilitate the draining of water in the mixing well to the spouts 118. The mixing well 130 has a collar 132 around its periphery which is pressed against an internal annular shoulder 134 within the lower portion 76B of the drain chamber to close the open drain chamber 76 except for the mixing nozzle spouts 128 and, if open, the by-pass brew strength nozzle assembly. Advantageously, the nozzle body 116A and mixing well 130 are automatically separated from both the body 116A and the drain chamber 76 when the level control tube 116B is unthreaded from its connection to member 126 to facilitate easy access to clean the spouts 118 and the other parts of the mixing nozzle assembly 116, drain chamber 76 and mixing well 130.

Still referring to FIG. 4, the brew strength control nozzle assembly 80 is seen to include a set screw 80A threadably adjusted within an internally threaded bore of a by-pass nozzle body 80B to either entirely block the fluid connection between a by-pass valve inlet 80C and the by-pass nozzle outlet 80D, as shown in FIG. 4, for maximum brew strength, or to completely or partially unblock the fluid connection path so that minimum brew strength or an intermediate brew strength is achieved.

The valve inlet 80C is connected by a by-pass tube 80E to a by-pass outlet 138 in the side wall of drain chamber 76 just above the closure collar 132 to convey water collected at the top of the closure collar 132 at the bottom of the drain chamber 76. When the brew strength is set at maximum, as shown in FIG. 4, no water flows through the by-pass nozzle outlet 80D. In that event, the surface of the water temporarily collected in the lower portion 76B of the drain chamber can rise beyond the control level 122 to increase the outflow drain rate from the mixing nozzle to prevent the surface from rising to the maximum surface level 110. On the other hand, if the brew strength is set at minimum, by raising the position of set screw 80A entirely out of blocking relationship, between valve inlet 80C and nozzle outlet 80D, the surface does not rise above the control level 122 because the water is drawn from the drain chamber 76 at an increased rate due to the water removed through the beverage strength control nozzle assembly 80 in addition to removal through mixing nozzle spouts 128. At intermediate settings, the level can fluctuate between the upper level 110 and lower level 112.

Referring now to FIG. 5, an alternative embodiment 140 of the dispenser shut-off valve assembly of the invention is shown in which a tube 142 with a dispenser valve inlet opening 144 is moved between an open position, as shown in FIG. 5, to a closed position in which the dispenser valve inlet hole 144 is raised above the preselected level 52 by extending the effective length of the tube 142. The tube 140 is slideably enclosed in an upturned portion 142A of another tube 146 connected to inlet hole 105. A coil spring 148 biases a spring retainer 150 attached to the tube 140 toward an open position with the effective length of tube 142 fully extended. A solenoid, motor or other electronic apparatus (not shown) linked to the spring retainer 150 to move it to, and keep it in, an open position, as shown in FIG. 5, during the brew cycle. In this way if there is a loss of power during brewing, the coil spring 148 will automatically return the tube 142 to the closed position.

Referring to FIGS. 6A and 6B, another advantageous feature of the beverage maker of the present invention is the provision of a hot water drain assembly 152 for draining water from the supply tank 38 at a hot water draw level 154 adjacent the preselected surface level 52, where, advantageously, the water is the hottest and head pressure lowest, and also for draining the entire supply tank through the hot water faucet 36. The drain assembly includes an elongate, metal, hot water draw tube 156 which extends from the connector 155 to hot water tube 40 at the bottom of the supply tank to a hot water inlet opening 158. When the faucet 36 is opened, hot water is drawn through the hot water draw inlet opening 158, through the hot water draw tube 156, through the connector 155 and tube 40 and at the faucet 36.

Referring to FIG. 6B, the connector 155 is seen to include a hot water drain hole 160 in the side of an upstanding portion 155A of the connector 155 which extends upwardly into the supply tank 38. This drain hole 160 is uncovered when the lower end 156A of hot water draw tube 156 is raised above the hot water drain hole 160. Preferably the lower end 156A of the draw tube 156 and the upstanding portion 155A are threaded together, as shown, and the drain hole 160 is exposed by rotating the hot water draw tube 156 relative to the upstanding portion 155A. However, a sliding or other rotary movement could also be used to open the drain hole 160.

In any event, in keeping with another aspect of the invention, the hot water draw tube 156 has an extension 156B which extends beyond the hot water draw hole 158 to above the surface level 52 which to function as a handle to move the blocking lower end portion 156A. In order to drain the entire supply tank, all that is required is to remove the tank cover 38A, FIG. 6A, rotate the hot water draw tube 156 by means of the extension 156B above the surface level 52 until the drain hole 160 is exposed and to then open the faucet 36. The entire tank will then drain through the faucet.

Preferably, a screw driver slot is formed at the end of the extension 156B by means of a crimp. Once drained, the drain hole 160 is again covered by screwing down the end portion 156A onto the upstanding connector portion 155A to secure the drain tube 156 to the connector.

Referring to FIGS. 7A and 7B, another advantageous feature of the beverage maker is that the urns, such as urn 24B, are insulated to eliminate the need for a heating element in the base section 22A without enlarging the outside dimensions of the urn. This is achieved by providing urn 24B with an inner metal container 162 which, instead of being cylindrical as in known containers, is substantially rectangular in cross section to conform to the rectangular shaped, metal, outer urn housing 164. This construction enables a more uniformly thick layer 166 of insulating material 166 to be provided along the side walls 162A. As seen in FIG. 7A, preferably, the four side edges where the side walls 162A are located adjacent the four corners 164A of the outer housing 164 have rounded sections 162C, like tapered sections 162B, at the top and bottom corners, to provide additional insulation at the corners where relative heat loss would otherwise be greater.

The bottom 164B of the outer housing is also provided with a relatively thicker layer of insulation and includes a base support 164C made of durable insulating material which extends slightly below the bottom 164B of the metal side walls of the outer housing 164. This advantageously provides additional insulation between the housing side walls and the metal shelf 24A' of the base section 22, FIGS. 1A and 1B.

Improved insulation is also provided at the top 164D of the outer housing 164. Unlike many known commercial sized containers which have an opening to the inner container 162 which is substantially coextensive with the cross section of the inner container, the inner container 162 has a relatively narrow, centrally located neck 162C, so that a top layer of insulation 166A can be provided between a shoulder 162D and the metal top 164D. This is particularly important since heat rises and thus most of the heat loss would be through the top if it were not for the insulation In addition, the opening of the neck is also substantially covered by a removable, durable, insulating cap 34, which is resiliently fitted to the neck by means of a resilient insulating annular mounting ring 169 secured to an outwardly curved portion of the neck 162C which extends above the top 164D. This mounting ring insulates the top 164D from the neck 162C and is secured within a mating, peripheral, annular, mounting channel 170 along with the upstanding portion of the neck 162C to insulate the neck 162C on its inside surface. The funnel opening 172 located within the neck is needed for receipt of water from a releasible funnel inlet opening 174 above the neck is made relatively small so that the escape of heat from the container is further reduced.

Referring to FIGS. 8 and 9, the beverage maker of this invention is also advantageously provided with an improved housing with a reduced number of parts which enables a simplified assembly. A first, generally H-shaped piece of metal 176 is provided with two right angle bends to define edges 180 and 182 of the back 184 of the upper section 22C, the intermediate section 22B and the base section 22A. The first part 176 also includes a pair of parallel walls 186 and 188 with wide slots 178 to form separate walls 186 and 188 into the parallel sides of the upper portion 22C, intermediate portion 22B and base portion 22A.

A second part 190 has two opposed right angle turns 192 and 194 to form the front 196 of the intermediate section 22B, the cantilevered underside 198 of the upper portion 22C and part of the front 200 of the upper section 22C.

A thick Z-shaped part 202 is attached to the top of the first part 176 and extends between the parallel walls 186 and 188 to form the back part 204 of the top of the upper section 22C as well as the bottom 206 and back side 208 of the storage compartment 58.

An L-shaped part 210 is attached by hinged connector 68 of part 202 to form the top part 212 and remainder of the front part 214 of upper section 22C comprising the cover 64 of the storage compartment 58.

The base section 22A is then completed with fifth, sixth and seventh parts 216, 218 and 220. Mounting brackets 224 for inside parallel tracks 222 are welded to the second part 190.

Referring to FIGS. 10A, 10B and 10C, another improved feature of the beverage maker of the present invention is the provision of an improved dry ingredient filter holder 230 which prevents filter distortion and collapse of the filter wall on top of the dry ingredient. The holder 230 has a truncated conical body 231 with a conforming filter basket 232 and a square collar 234. The collar 234 advantageously has a by-pass inlet section 236 attached to the inlet 238 of body 231 which extends outwardly away from the periphery of the inlet 238 at one of the four corners of the collar 234 to form at least one by-pass inlet 240 for receipt of liquid from the by-pass nozzle 80. The collar 234 performs the additional function of slideably mating with a pair of parallel tracks 242 and 222, FIGS. 1A, 1B and 8, on the underside of the upper section 22C. A handle 243 is attached to the collar 234 to facilitate removal of the holder 230.

A by-pass channel, or gap, 244 between the truncated conical filter basket 232 and the interior of the side wall of body 231 is provided for flow of water received in the by-pass drain to a dispenser opening 246 at the bottom of body 231 without passing through the filter. Because of this arrangement, the conical filter is permitted to conform to the body 231 without distortion, and collapse of the top of the filter over the filter inlet is prevented.

Figure 11:
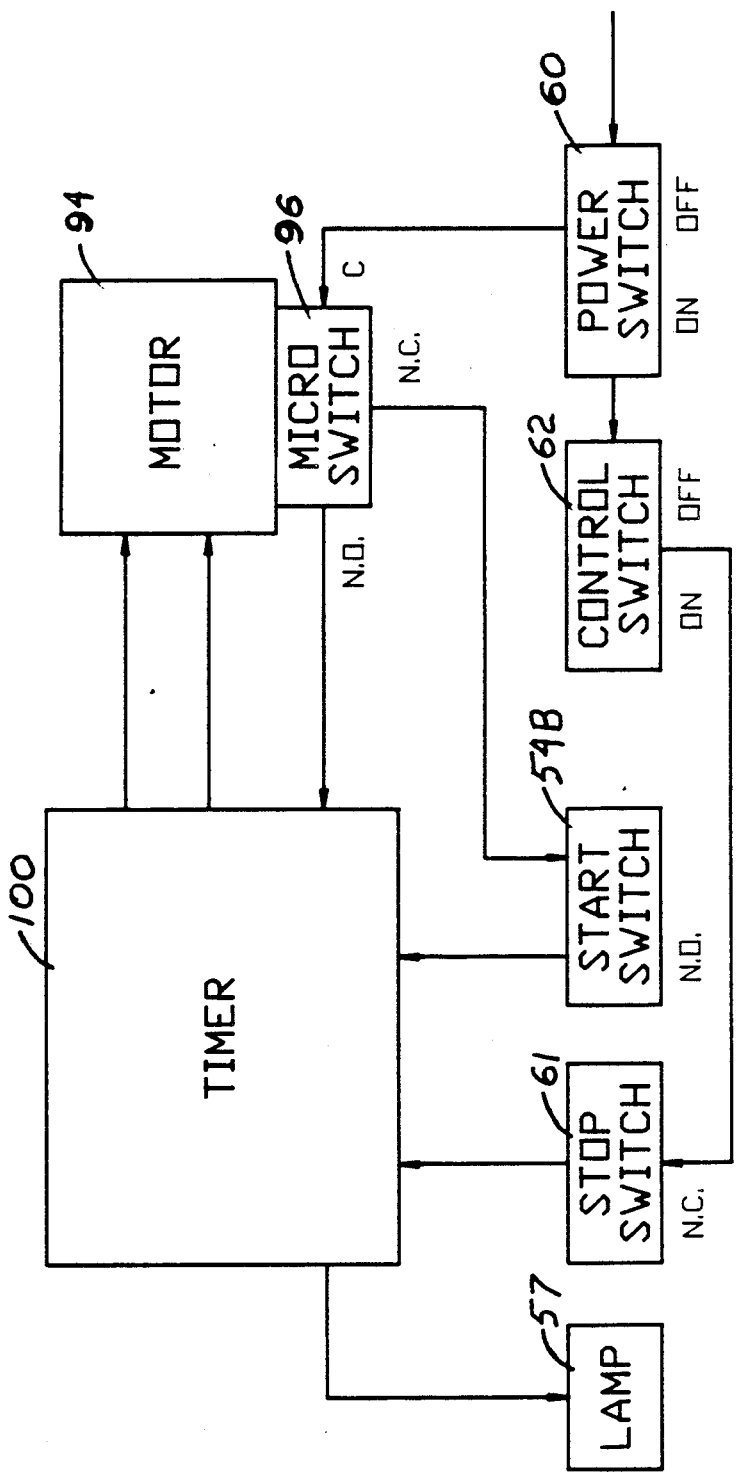
FIG. 11 is a block diagram of the preferred embodiment of a brew cycle controller circuit for the beverage maker.

Referring to FIG. 11, the brew cycle control circuit for the beverage maker embodiment of FIGS. 1A, 1B, 1C and 2 operates to open and close the dispenser shut-off valve in response to the manual start switch 54B, the control switch 62, a stop switch 61 and the cam operated microswitch 96. Presuming power switch 60 is ON, power is supplied to the control switch 62 and the microswitch 96. If the valve is in its closed position, the microswitch 96 is closed, and power from the power switch 60 is applied to the input of the start switch 54B to enable it to provide a start pulse to the timer 100. Otherwise, the microswitch 96 is open, and the start switch 54B is disabled from generating a start pulse in response to manual actuation of the start switch 54B.

If the control switch 62 is ON, when power is turned on, power is also applied to an emergency stop switch 61 to enable it to generate a reset pulse to the timer 100, if actuated. The manual actuator for the stop switch 61 is common with the actuator of the start switch 54B, as shown in FIG. 1A. In the event of actuation of the pulse during the brew cycle, the timer 100 stops timing, is reset and the motor is caused to move the dispenser shut-off valve to the closed position.

Presuming the power switch 60 is on and the control switch 62 is off on, when the normally open start switch 56B is actuated, a start pulse is generated to reset the timer 100 unless the microswitch 96 is in a position indicating that the dispenser valve is not in the closed position. In addition to resetting the timer 100, the timer is actuated to start the brew cycle time period. During a first time period, on the order of five seconds, the timer 100 provides a signal on one of its outputs to the motor which causes it to rotate the tube 84 until the inlet opening 84C has been moved to the fully open position shown in FIG. 3. The timer 100 then continues to count time for a period on the order of four minutes during which no energization signals are provided to the motor and the dispenser valve is kept open. At the end of this second period, a signal is applied on other output of timer 100 to energize the motor in an opposite sense to cause it to rotate the tube 84 back to the closed position, as shown in FIG. 2. During the brewing cycle, the lamp 57 is also caused to light during the second period.

While the preferred embodiment has been disclosed in detail, it should be realized that many variations may be made with respect to these details without departing from the spirit of the invention. For instance, while the beverage maker has been disclosed with reference to making hot coffee, it should be appreciated that it could also be used to make tea, cocoa, broth or any other beverage in which hot or cold water or other liquid ingredient is dispensed through a dry ingredient. Likewise, although a rotary motor has been disclosed, a solenoid or other electromechanical device could be substituted. While only rigid tubes have been disclosed, flexible tubes are contemplated. Likewise, the control need not be automatic in order to take advantage of the many novel features of the beverage maker of this invention. Therefore, reference should be made to the claims appended hereto in which the scope of the protection sought for this invention is set forth.

I claim:

1. In a beverage maker having a supply tank with a dispenser outlet hole and means for maintaining the surface of any liquid in the supply tank at a substantially fixed preselected level, the improvement being a shut-off dispenser valve for selectively blocking and enabling removal of any liquid within the supply tank through the dispenser outlet hole at a uniform rate, comprising:
   a tube having
      a tubular body extending through the dispenser outlet hole between
      a fixed end portion with a free valve outlet opening outside of the supply tank, and
      a distal end portion with a free valve inlet opening inside the supply tank and in fluid communication with the valve outlet opening through the tubular body; and
   means for selectively moving the distal end and free valve inlet opening between
      an open position at a preselected fixed depth below the substantially fixed preselected surface level to enable said liquid to flow through the free opening, the tubular body and finally out through the valve outlet opening at a preselected, uniform rate, and
      a closed position above the preselected surface level of any liquid within the supply tank to block removal of said liquid through the free valve inlet opening.

2. The beverage maker of claim 1 in which said tubular body extends substantially beyond the dispenser outlet hole for connection with a linkage for moving the tube.

3. The beverage maker of claim 1 in which at least a portion of said tubular body within the supply tank is curved.

4. The beverage maker of claim 1 in which said tubular body is substantially rigid.

5. The beverage maker of claim 1 in which
   said distal end portion is elongate, and
   said moving means includes means for moving at least the distal end portion in a direction along its length.

6. The beverage maker of claim 1 in which
   said tubular body has a portion within the supply tank which is substantially straight, and
   said moving means includes an electromechanical apparatus for selectively, reciprocally moving said distal end portion of the tubular body above and below said preselected surface level.

7. The beverage maker of claim 1 in which said moving means includes means for rotating the fixed end of the tubular body to raise and lower the distal end portion and free valve inlet opening below and above the preselected surface level of the liquid.

8. The beverage maker of claim 7 in which
   said tubular body has a curved portion, and
   said rotating means includes means for rotating the tube about an axis passing through a portion of the tubular body and the dispenser outlet hole.

9. The beverage maker of claim 7 in which said rotating means includes
   a motor, and
   means for linking the motor to the tubular body to rotate a portion thereof to selectively move the distal end above and below the preselected liquid surface level.

10. The beverage maker of claim 1 in which the preselected surface level is lower than the highest level in the tank to which the distal end is capable of being moved.

11. The beverage container of claim 1 including
   a mixing nozzle for passing liquid to a dry ingredient, and
   means for mounting said free valve outlet opening in a substantially fixed position relative to said mixing nozzle.

12. The beverage maker of claim 1 in which
   said moving means includes
   a motor linked to the distal end,
   an electronic start switch,
   a motor controller including
      means for causing the motor to move the distal end portion to a preselected level beneath the surface in response to actuation of the start switch, and
      means for automatically causing the motor to return the distal end portion to the closed position a preselected time period after actuation of the start switch.

13. The beverage maker of claim 12 in which
   said liquid is hot water that is passed through dry, ground, coffee beans, and
   said preselected time period is approximately 4.5 minutes.

14. The beverage maker of claim 12 in which said automatically causing means includes
   a timer for establishing a preselected time period,
   means for starting the timer in response to actuation of the start switch, and
   means responsive to the lapse of said preselected time period to control the application of electrical power to the motor to raise the distal end portion to the preselected closed position above the surface.

15. The beverage maker of claim 12 in which said preselected time period is a composite of first and second time periods, electrical power to said motor being controlled to lower the distal end portion to the open position during the first time period and to keep the distal end portion in the open position during the second time period and to return the distal end portion to the closed position at the end of the second time period.

16. The beverage maker of claim 1 in which
said tubular body extends at least partially in a vertical direction between the distal end portion and the fixed end portion when the distal end portion is in its closed position above the surface of the liquid, and in which
said fixed end portion is freely open to atmosphere to facilitate complete draining of the tube of all liquid when the dispenser shut off-valve is closed.

17. The beverage maker of claim 1 in which
said free inlet valve opening of said distal end is raised above the preselected surface level to a higher preselected overflow level in the supply tank when in a closed position, and
said fixed end is kept freely open to atmosphere when in the closed position to enable flow of liquid therethrough and out of the supply tank in the event of an overflow condition in the tank.

18. The beverage maker of claim 1 in which said selectively moving means includes
a mechanical apparatus for automatically returning the distal end to a closed position above the preselected liquid surface level in the event of electrical power losss to said moving means.

19. The beverage maker of claim 18 in which said apparatus comprises a spring.

20. The beverage maker of claim 18 in which said moving means includes an electromechanical apparatus for automatically moving the distal end portion to the open position.

21. In a hot beverage maker having a supply of hot water to be selectively drawn through a dispensing system for mixing with a beverage ingredient, the improvement being a method of selectively dispensing said hot water to reduce the formation of solid deposits in said dispensing system which are evaporated out of said hot water, comprising the steps of:
providing a supply tank with a substantially fixed level of hot water therein,
dispensing said hot water from the supply tank at a substantially uniform rate through a smooth open free flowing tube by submerging an open, movable end thereof below the substantially fixed level of the liquid hot water supply tank and withdrawing water through a freely open, fixed end of the tube outside the supply tank;
terminating the dispensing of hot water through the tube by automatically raising the open movable end above the surface of the hot water after a preselected time period; and
removing water from the entire tube by holding at least a portion of the tube at an angle having a vertical component to cause gravity to drain residual water out through the open fixed end of the tube outside of the supply tank while keeping the fixed end freely open to atmosphere.

22. The method of claim 21 in which
said tube has a relatively straight portion which extends through the outlet hole and a curved portion within the tank, and
said step of submerging the open, movable end includes the step of rotating the tube about an axis passing through said relatively straight portion.

23. The method of claim 21 in which said step of removing water from the tube includes the steps of
developing a head of steam pressure in a space above the surface of liquid in the supply tank by heating the liquid and providing a cover to the supply tank, and
inserting the movable free open end into free fluid communication with the steam pressure in the space to clear the tube of water by passing said pressurized steam therethrough while maintaining the fixed end freely open to atmosphere.

24. In a hot beverage maker having a supply of hot water to be selectively drawn from a supply tank through a dispensing system for mixing with beverage ingredient, the improvement being a method of selectively dispensing said hot water from the supply tank to reduce the formation of solid deposits in said dispensing system which are evaporated out of said hot water, comprising the steps of:
dispensing said hot water from the tank through a smooth, open substantially straight and elongate free flowing tube by submerging an open, movable end thereof below the surface of the liquid hot water supply tank and withdrawing water through a freely open, fixed end of the tube outside the supply tank;
terminating the dispensing of hot water through the tube by raising the open movable end above the surface of the hot water;
removing water from the entire tube by holding at least a portion of the tube between the movable and fixed ends in an orientation having a vertical component when the open end is in a closed position above the surface of the liquid to cause gravity to drain residual water out through the open fixed end of the tube outside of the supply tank while keeping the fixed end freely open to atmosphere.

25. In a beverage maker having a supply tank for a liquid ingredient and a dry ingredient holder, the improvement being a system for conveying the liquid ingredient through the dry ingredient, comprising:
means for removing liquid from the supply tank at a uniform preselected rate, and
including means for maintaining the surface of the liquid in the supply tank at a preselected level relative to that of the dispenser outlet opening including a dispenser outlet opening at a preselected level in said supply tank; and
a pressure isolation drain chamber open to atmosphere for receipt at said preselected rate and temporary collection of the liquid before passing it to the dry ingredient holder, said drain chamber having an upper portion for free flowing receipt through air of a stream of liquid from the supply tank and a lower portion with a drain hole for downwardly passing the liquid received at the top to the dry ingredient holder at a rate relative to the preselected rate that said stream of liquid temporarily collected is received in the upper portion to maintain the level of liquid therein beneath said upper portion,
said drain chamber having a configuration for a selected minimum drain rate at which it passes liquid to the solid ingredient holder that is substantially not less than said uniform rate of removal from the supply tank; and
means for maintaining said uniform rate including
a freely open outlet tube through which the liquid from the supply tank is selectively passed to the drain chamber, and
means for draining the outlet tube of liquid when not passing liquid from the supply tank to prevent the formalin of deposits within said outlet tube including means for blocking the entry of liquid into the tube, and means for holding at least a portion of the tube in at least a partially vertical orientation to cause gravity to drain residual liquid out from the tube when entry of liquid into the tube is prevented by said blocking means.

26. The beverage maker of claim 25 in which said means for blocking entry of liquid into the tube includes means for raising the open inlet above a preselected maximum liquid surface level within the supply tank.

27. The beverage maker of claim 26 in which said means of raising the open inlet includes said means for holding at least a portion of the tube in at least a partially vertical orientation.

28. In a beverage maker having a supply tank for liquid ingredient, a mixing nozzle for conducting liquid from the supply tank to a mixing location where it is dispensed through and mixed with a dry beverage ingredient within a holder and a beverage strength control by-pass valve assembly for conducting liquid to a by-pass location where it is dispensed into the holder without passing through and mixing with the dry beverage ingredient, the improvement being a pressure isolating, drain assembly, comprising:

a drain chamber having an upper portion with an inlet for receipt of liquid from the supply tank and a lower portion for temporary collection of the liquid before passing the collected liquid to the mixing nozzle;

means for isolating the head pressure of the supply tank liquid from the temporary collection of liquid in the drain chamber including means for holding the surface level of the temporary collection of liquid in the drain chamber below the inlet in the upper portion to cause the liquid from the supply tank to be received into the upper portion as a stream through air including a level control member with a level control port located at a level intermediate the inlet in the upper portion of the drain chamber and the lower portion adjacent the mixing nozzle for passing additional liquid collected in the lower portion to the mixing locating when the surface of the temporary collection of liquid rises to the level of the level control port; and means for connecting said beverage strength control by-pass valve assembly to said lower portion to draw liquid from said temporary collection of liquid in the lower portion of the drain chamber.

29. The beverage maker of claim 28 in which said level control member comprises a tube extending between a level control outlet draining to the mixing nozzle and the level control port in the tube and located beneath the inlet in the upper portion.

30. In a beverage maker having a supply tank for liquid ingredient and a dry ingredient holder, the improvement being a dispenser nozzle assembly, comprising:

a drain chamber for temporarily collecting liquid ingredient from the supply tank prior to it being dispensed through an outlet opening thereof into the dry ingredient holder; and a dispenser nozzle having a body with a plurality of open channels attached to the drain chamber with a peripheral edge in substantial contiguous mating relationship with said outlet opening except at a plurality of spouts, said spouts being defined partly by said open channels and partly by the drain chamber at the periphery of the outlet opening.

31. The beverage maker of claim 30 in which said body has a centrally located raised portion with an upper surface, and said channels are formed in said upper surface and radiate outwardly therefrom to said peripheral edge.

32. The beverage maker of claim 30 including an elongate level control tube attached to said dispenser nozzle body and extending therefrom into the drain chamber, said level control tube having a level control port at an upper end within the drain chamber and an outlet opening for conveying liquid therethrough into the dry ingredient holder in the event the liquid in the drain chamber reaches a preselected level.

33. The beverage maker of claim 31 in which said nozzle body and drain chamber are threaded together.

34. The beverage maker of claim 31 in which said drain chamber has a receiving inlet opening for receipt of liquid from the supply tank, and said level control inlet opening is located at a level spaced beneath said inlet opening to keep the level of the liquid beneath said receiving inlet opening.

35. The beverage maker of claim 31 in which said drain chamber includes a by-pass line for removal of said liquid temporarily collected in said drain chamber when the level of said temporarily stored liquid is beneath said inlet opening to isolate it from the liquid pressure head of any liquid in supply tank.

* * * * *